(12) United States Patent
Wagner

(10) Patent No.: US 9,837,644 B2
(45) Date of Patent: Dec. 5, 2017

(54) VEHICLE BATTERY SYSTEM WITH NON-UNIFORMLY SPACED CELLS

(75) Inventor: Thomas A. Wagner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1475 days.

(21) Appl. No.: 13/350,899

(22) Filed: Jan. 16, 2012

(65) Prior Publication Data

US 2013/0183564 A1    Jul. 18, 2013

(51) Int. Cl.
| | |
|---|---|
| H01M 2/10 | (2006.01) |
| H01M 10/625 | (2014.01) |
| H01M 10/6563 | (2014.01) |
| H01M 10/6557 | (2014.01) |
| H01M 10/6566 | (2014.01) |
| H01M 10/613 | (2014.01) |

(52) U.S. Cl.
CPC ....... *H01M 2/1077* (2013.01); *H01M 10/613* (2015.04); *H01M 10/625* (2015.04); *H01M 10/6557* (2015.04); *H01M 10/6563* (2015.04); *H01M 10/6566* (2015.04); *H01M 2220/20* (2013.01)

(58) Field of Classification Search
USPC ........................................................ 429/120
See application file for complete search history.

(56) References Cited

U.S. PATENT DOCUMENTS

| | | | |
|---|---|---|---|
| 6,479,185 B1 | 11/2002 | Hilderbrand et al. | |
| 6,953,638 B2 | 10/2005 | Inui et al. | |
| 2002/0028376 A1* | 3/2002 | Yamane et al. | 429/120 |
| 2006/0091856 A1* | 5/2006 | Lee et al. | 320/116 |
| 2009/0017366 A1 | 1/2009 | Wood et al. | |
| 2009/0258282 A1* | 10/2009 | Harada et al. | 429/61 |
| 2010/0047682 A1* | 2/2010 | Houchin-Miller et al. | 429/120 |
| 2011/0177367 A1* | 7/2011 | Chung et al. | 429/83 |
| 2011/0229749 A1* | 9/2011 | Kim et al. | 429/120 |

* cited by examiner

Primary Examiner — Miriam Stagg
Assistant Examiner — Lilia V Nedialkova
(74) Attorney, Agent, or Firm — David B. Kelley; Brooks Kushman P.C.

(57) ABSTRACT

A battery assembly includes a housing defining a plenum having an inlet, and a row of battery cells disposed within the housing. Each adjacent pair of the cells defines a gap in fluid communication with the plenum. The gaps proximate to the inlet are narrower than the gaps distant from the inlet to promote generally equalized flow of fluid through the gaps.

2 Claims, 3 Drawing Sheets

VEHICLE BATTERY SYSTEM WITH NON-UNIFORMLY SPACED CELLS

TECHNICAL FIELD

This disclosure relates to the cooling of battery arrays used in powering vehicles, such as plug-in hybrid electric vehicles (PHEVs), in which air may be directed through gaps between cells within the arrays.

BACKGROUND

An electrified vehicle (e.g., hybrid, plug-in hybrid, battery electric, etc.) includes a battery pack having one or more cells electrically connected together. These cells store energy that may be used to move the vehicle. For example, the cells may be electrically connected with an electric machine that transforms electrical energy to mechanical energy to move the vehicle, and mechanical energy to electrical energy to be stored by the cells. Providing energy to or removing energy from the cells may cause them to generate heat. This heat, if not properly dissipated, may interfere with the proper operation of the battery pack.

SUMMARY

A vehicle includes an electric machine that generates motive power for the vehicle and a battery assembly. The battery assembly includes a row of battery cells electrically connected with the electric machine, and a plenum having an inlet in fluid communication with a source of air. Adjacent pairs of the battery cells define gaps therebetween in fluid communication with the plenum. The gaps proximate to the inlet are narrower than the gaps distant from the inlet to promote generally equalized flow of the air through the gaps. The gaps associated with the cells proximate to the inlet may have a first width and the gaps associated with the cells distant from the inlet may have a second width greater than the first width. An arrangement of the gaps may be such that the air flows through the gaps with respective flow velocities. The flow velocities may be approximately equal. The battery assembly may include additional rows of battery cells stacked one on top of the other and electrically connected with the electric machine. Adjacent pairs of the rows may each define a spacing therebetween. The spacings proximate to the inlet may be narrower than the spacings distant from the inlet to promote generally equalized flow of the air through the gaps.

A battery assembly includes a housing defining a plenum having an inlet, and a plurality of rows of battery cells stacked one on top of the other within the housing. Adjacent pairs of the rows may each define a spacing therebetween in fluid communication with the plenum. The spacings proximate to the inlet are narrower than the spacings distant from the inlet to promote generally equalized flow of fluid through the spacings. The plenum may be in fluid communication with a source of air via the inlet. The air may flow through the spacings with respective flow velocities. The flow velocities may be approximately equal. Adjacent pairs of the battery cells of one of the rows may each define gaps therebetween in fluid communication with the plenum. The gaps proximate to the inlet may be narrower than the gaps distant from the inlet. The gaps associated with the cells proximate to the inlet may have a first width and the gaps associated with the cells distant from the inlet may have a second width greater than the first width. The plenum may be in fluid communication with a source of air via the inlet. The air may flow through the gaps with respective flow velocities. The flow velocities may be approximately equal.

A battery assembly includes a housing defining a plenum having an inlet and a row of battery cells disposed within the housing. Each adjacent pair of the cells defines a gap in fluid communication with the plenum. The gaps proximate to the inlet are narrower than the gaps distant from the inlet to promote generally equalized flow of fluid through the gaps. The gaps associated with the cells proximate to the inlet may have a first width and the gaps associated with the cells distant from the inlet may have a second width greater than the first width. The plenum may be in fluid communication with a source of air via the inlet. The air may flow through the gaps with respective flow velocities. The flow velocities may be approximately equal. The battery assembly may include additional rows of battery cells stacked one on top of the other. A spacing between adjacent pairs of the rows proximate to the inlet may be narrower than a spacing between adjacent pairs of the rows distant from the inlet to promote generally equalized flow of fluid through the spacings.

DETAILED DESCRIPTION

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Uniform cooling of cells within an automotive battery system may improve battery performance and reduce cooling fan power requirements. As the number of cells in an array increases, however, providing uniform air flow throughout the stack becomes increasingly difficult. This may be especially true when vehicle packaging requirements limit inlet plenum volume, which can promote noticeable pressure differences therein. Such pressure differences in, for example, a conventional twenty eight cell array may result in significant variations in air velocities around cells at different locations in the stack. Reduced air flow around some cells may result in lower current densities, degraded performance, etc.

Figure 1:
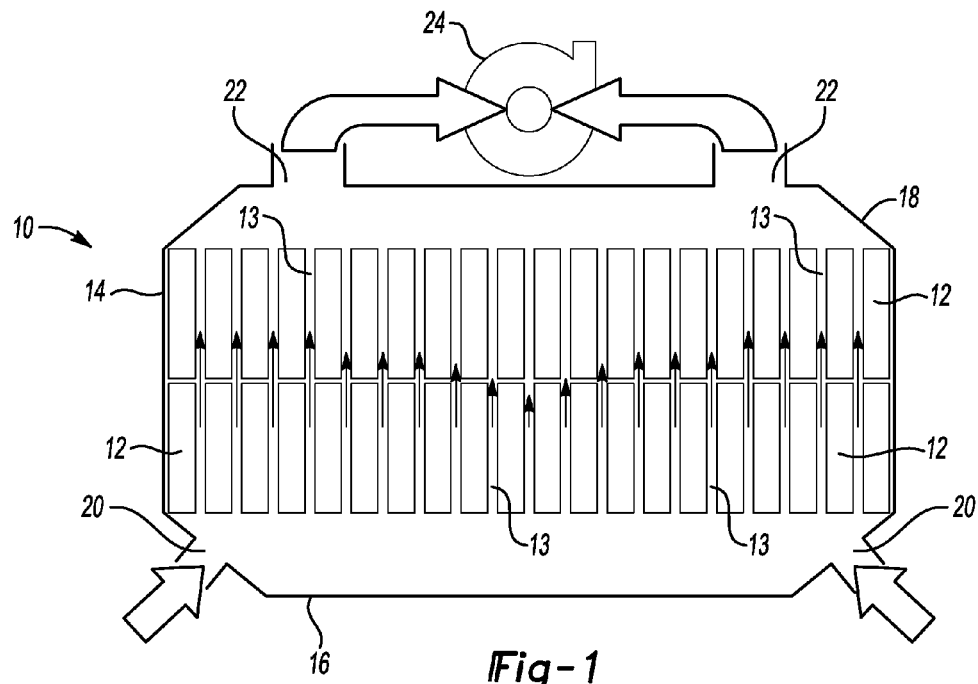
FIGS. 1 and 2 are diagrammatic views of battery arrays in which battery cells are evenly spaced.

FIG. 1 diagrammatically depicts a battery assembly 10 with two rows of battery cells 12. The cells 12 of each row are equally spaced apart. Hence, gaps 13 between the cells 12 of the same row are generally equal. The cells 12 are surrounded by a housing assembly 14 that further defines an inlet plenum 16 and outlet plenum 18. In the example of FIG. 1, the inlet plenum 16 includes two air inlets 20 in fluid communication with a source of air and the outlet plenum 18 includes two air outlets 22 in fluid communication with a blower 24. The blower 24 is arranged to pull air through the assembly 10. That is, cooling air typically enters the assembly 10 through the inlets 20, passes through the inlet plenum 16 and gaps 13, and exits the assembly 10 by way of the outlet plenum 18 and outlets 22.

Analysis indicates that the gaps 13 located proximate to the inlets 20 experience greater air flow velocities relative to the gaps 13 located distant from the inlets 20. The pressure within the inlet plenum 16 decreases as a function of distance from the inlets 20. Hence, inlet plenum pressure is at a maximum near the inlets 20 and at a minimum approximately half way between the inlets 20. The gaps 13 exposed to these lesser inlet plenum pressures will generally experience decreased flow velocities relative to the gaps 13 exposed to greater inlet plenum pressures because the gaps 13 are of equal width.

Decreased flow velocities result in less cell cooling. A speed of the blower 24 may be increased to account for the reduced cooling experienced by the cells 12 located near the center of the assembly 10. Increases in power consumption by the blower 24 associated with increased blower speed, however, may be undesirable. Furthermore, for a given inlet flow velocity, increased inlet plenum volume may reduce differences in pressure within the inlet plenum. Packaging constraints and cost, however, may restrict inlet plenum size.

Figure 2:
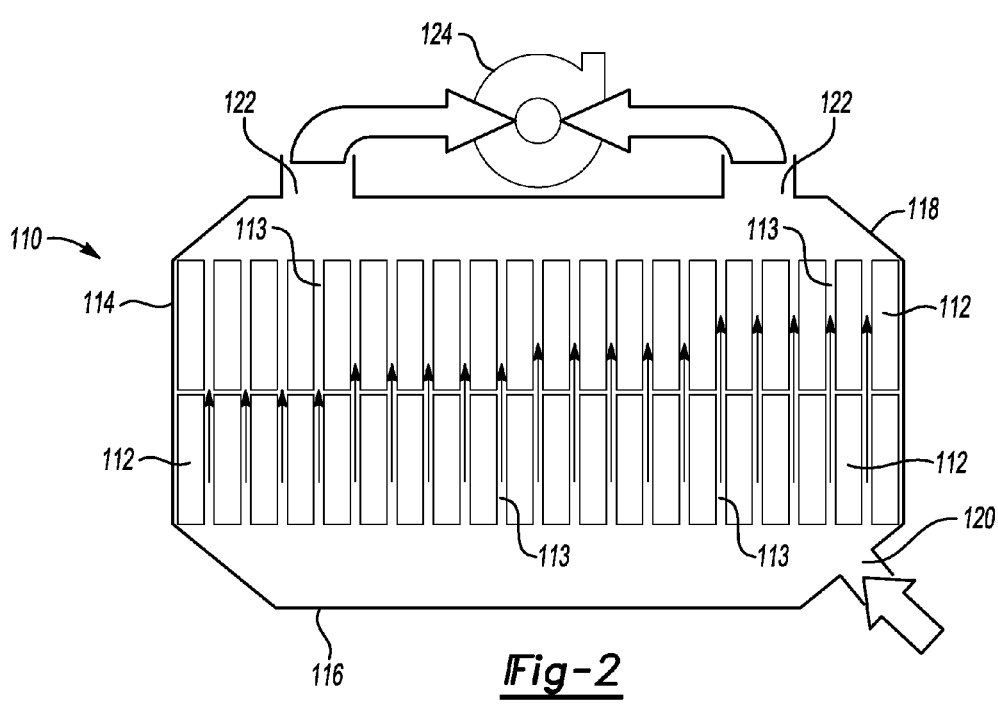

FIG. 2 diagrammatically depicts a battery assembly 110 with two rows of battery cells 112. The cells 112 within each row are equally spaced apart. Hence, gaps 113 between the cells 112 of the same row are generally equal. The cells 112 are surrounded by a housing assembly 114 that further defines an inlet plenum 116 and outlet plenum 118. In the example of FIG. 2, the inlet plenum 116 includes a single air inlet 120 in fluid communication with a source of air and the outlet plenum 118 includes two air outlets 122 in fluid communication with a blower 124. The blower 124 is arranged to pull air through the assembly 110. For the reasons explained with reference to FIG. 1, the cells 112 distant from the inlet 120 experience reduced cooling relative to the cells 112 proximate to the inlet 120.

Certain battery assemblies described herein may be configured to reduce uneven cell cooling. Cells located distant from inlets, for example, may be spaced further apart as compared with cells located proximate to inlets to promote more uniform air flow through the stack.

Figure 3:
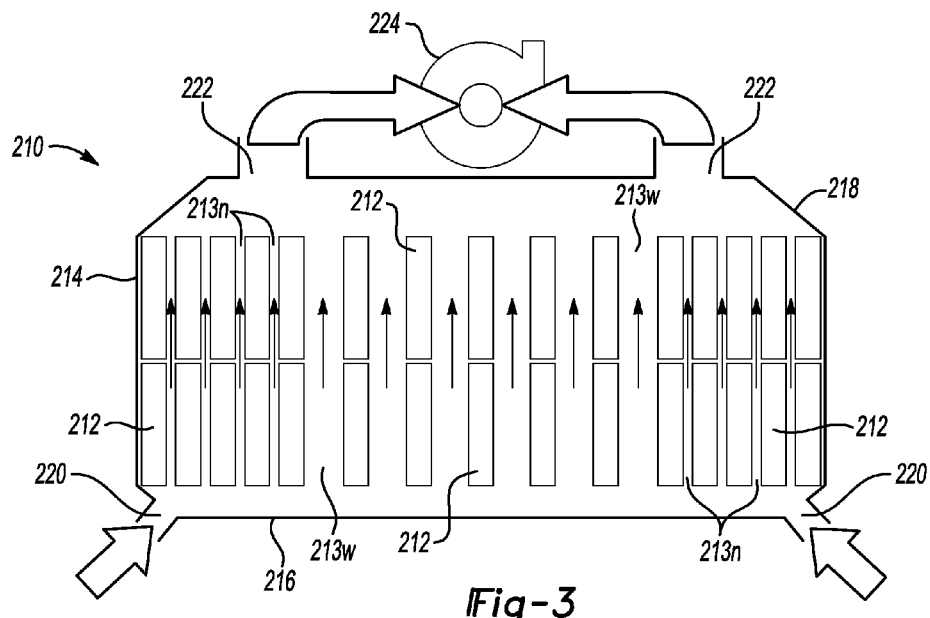
FIGS. 3 and 4 are diagrammatic views of battery arrays in which battery cells are not evenly spaced.

FIG. 3 diagrammatically depicts a battery assembly 210 with two rows of cells 212. The cells 212 within each row are not evenly spaced apart. In other examples, a greater or fewer number of rows may be present and/or multiple such rows may be stacked one on top of the other (e.g., into the page, out of the page, etc.). Other cell arrangements are also contemplated. The cells 212 are surrounded by a housing assembly 214 that further defines an inlet plenum 216 and outlet plenum 218. The plenums 216, 218 in other examples, however, may be separate from and attached to the housing 214, etc. In the example of FIG. 3, the inlet plenum 216 includes two air inlets 220 in fluid communication with a source of air, and the outlet plenum 218 includes two air outlets 222 in fluid communication with a blower 224. Any suitable number of inlets/outlets, however, may be used. The blower 224 is arranged to pull air through the assembly 210. In other embodiments, the blower 224 may be positioned upstream of the inlets 220 to push air through the assembly 210, etc.

The cells 212 proximate to the inlets 220 are spaced closer together compared with the cells 212 located distant from the inlets 220. Hence, gaps $213n$ between the cells 212 proximate to the inlets 220 are narrower compared with gaps $213w$ between the cells 212 distant from the inlets 220. The wider gaps $213w$ encourage air flow therethrough. The narrower gaps $213n$ restrict air flow therethrough. Hence, the air flow through the gaps $213n$, $213w$ is more uniform (compared with, for example, the gaps 13 of FIG. 1) given the pressure differences within the inlet plenum 216. That is, the wider gaps $213w$ in the presence of reduced inlet plenum pressures and the narrower gaps $213n$ in the presence of increased inlet plenum pressures yield flow velocities (volumetric flow rates) that are roughly equal.

Two spacing schemes are used in the example of FIG. 3, which result in the gaps $213n$, $213w$ having one of two possible widths. In other examples, multiple spacing schemes may be used. The cells may be arranged, for example, such that each of the gaps increases in width as the distance from the inlet increases until a center of the assembly is reached. Manufacturing and cost considerations, however, may limit the number of feasible spacing schemes. Testing, simulation, etc. may be used to determine optimum spacing between the cells 212 to achieve relatively uniform cell cooling given a target blower speed, inlet plenum volume, etc.

If multiple rows are stacked one on top of the other, the spacing between the stacked rows may similarly increase the further the stacked rows are from the inlet, etc. Rotating the page upon which FIG. 3 is illustrated into the landscape position, yet another example is presented in which fifteen rows of cells 212 are stacked one on top of the other. The spacings $213n$ between the rows proximate to the inlets 220 are narrower compared with the spacings $213w$ between the rows of the cells 212 distant from the inlets 220 to facilitate relatively uniform air flow between the rows.

Mounting racks/spacers of two different configurations may be used to achieve the spacing schemes of FIG. 3. That is, a single wide-spaced mounting rack may be used to position some of the cells 212 at wide intervals, resulting in the wider gaps $213w$. Two narrow-spaced mounting racks (one for each side of the assembly 210) may be used to position other of the cells 212 at narrow intervals, resulting in the narrower gaps $213n$. Any suitable apparatus for positioning the cells 212, however, may be used.

Figure 4:
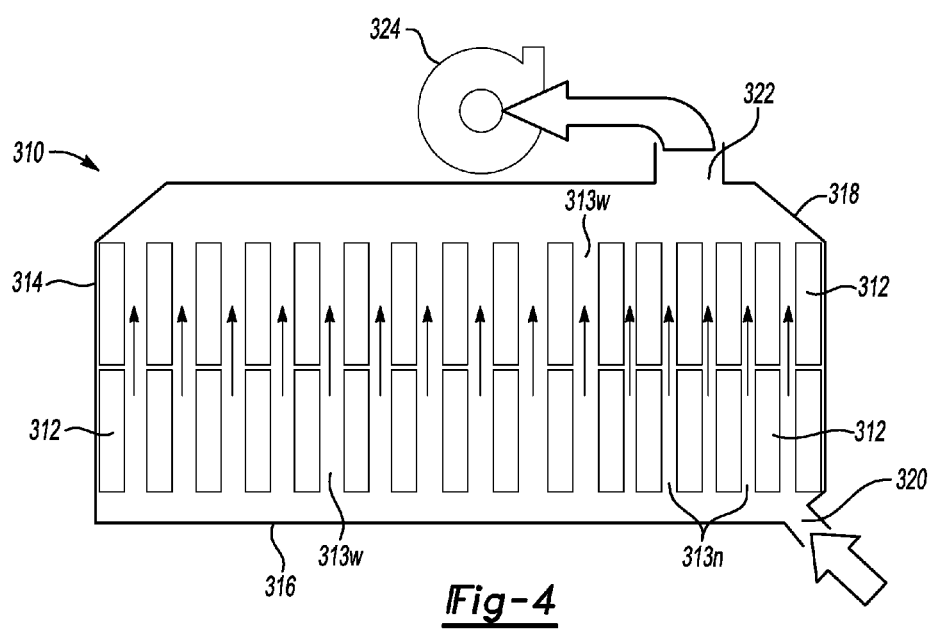

FIG. 4 diagrammatically depicts a battery assembly 310 with two rows of cells 312. As mentioned above, however, other cell arrangements are also possible. The cells 312 are surrounded by a housing assembly 314 that further defines an inlet plenum 316 and outlet plenum 318. In the example of FIG. 4, the inlet plenum 316 includes a single air inlet 320 in fluid communication with a source of air and the outlet plenum 318 includes a single air outlet 322 in fluid communication with a blower 324. The blower 324 is arranged to pull air through the assembly 310. In other embodiments, the blower 324 may be positioned upstream of the inlets 320 to push air through the assembly 310, etc.

Similar to the example of FIG. 3, the cells 312 within each row located proximate to the inlet 320 are positioned closer together compared with the cells 312 within each row located distant from the inlet 320. Hence, gaps $313n$ between the cells 312 proximate to the inlet 320 are narrower compared with gaps 313w between the cells 312 distant from the inlet 320. The wider gaps 313w promote air flow around their corresponding cells 312. The narrower gaps 313n restrict air flow around their corresponding cells 312. Hence, the air flow through the gaps 313n, 313w is more uniform (compared with, for example, the gaps 13 of FIG. 1) given the pressure differences within the inlet plenum 316. That is, the wider gaps 313w in the presence of reduced inlet plenum pressures and the narrower gaps 313n in the presence of increased inlet plenum pressures yield flow velocities that are roughly equal.

The inlet plenums 216, 316 have significantly less volume relative to the inlet plenums 16, 116 resulting in reduced overall space required to package the assemblies 210, 310 relative to the assemblies 10, 110. Even though differences in pressure within the inlet plenums 216, 316 may be more pronounced relative to the inlet plenums 16, 116, the effects of these differences may be mitigated by appropriate spacing of the cells 212, 312 as described herein. Hence, assembly arrangements similar to those described with reference to FIGS. 3 and 4 may not only enable more uniform cooling (and thus greater current densities and improved performance) but also reduce overall size (and thus cost and weight) relative to assembly arrangements similar to FIGS. 1 and 2.

Figure 5:
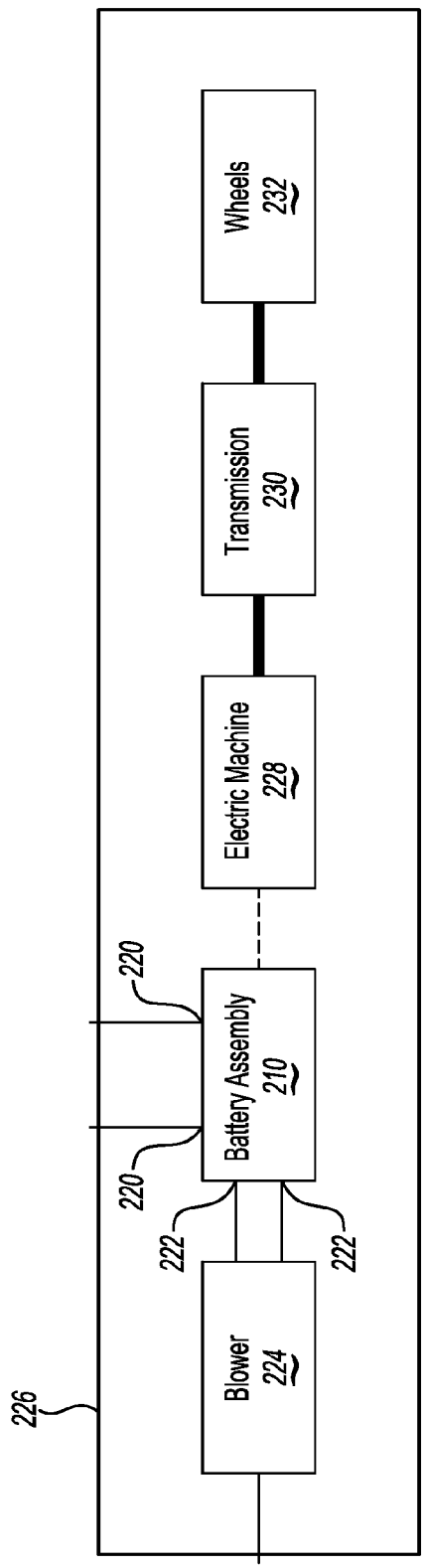
FIG. 5 is a diagrammatic view of an alternatively powered vehicle including the battery array of FIG. 3.

FIG. 5 diagrammatically depicts an alternatively powered vehicle 226 including the battery assembly 210 and blower 224 described above. The vehicle 226 further includes an electric machine 228, transmission 230, and wheels 232. The battery assembly 210 is in fluid communication with the blower 224 as indicated by thin solid line and is electrically connected with the electric machine 228 as indicated by dashed line. The transmission 230 is mechanically connected with the electric machine 228 and wheels 232 as indicated by thick solid line. Electrical energy from the battery assembly 210 may be transformed to mechanical energy by the electric machine 228 to move the wheels 232 via the transmission 230. Likewise, mechanical energy from the transmission 230 may be transformed to electrical energy by the electric machine 228 and stored by cells of the battery assembly 210.

The air inlets 220 and blower 224, in this example, are in fluid communication with an outside of the vehicle 226 as indicated by thin solid line. Hence, the blower 224 may pull ambient air through the battery assembly 210. Other arrangements, however, are also possible.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to generate motive power for the vehicle; and
a battery assembly including (i) a plurality of rows of battery cells stacked one on top of the other and electrically connected with the electric machine and (ii) a plenum having an inlet in fluid communication with a source of air, adjacent pairs of the rows each defining a spacing therebetween in fluid communication with the plenum, the spacing proximate the inlet being narrower than the spacings distant from the inlet, adjacent pairs of the battery cells for one of the rows defining gaps therebetween, and the gaps proximate the inlet being narrower than the gap distant from the inlet.

2. A battery assembly comprising:
a housing defining a plenum having an inlet; and
a plurality of rows of battery cells disposed within the housing such that spacings between adjacent pairs of the rows proximate the inlet are narrower than the spacings distant from the inlet, and that gaps for one of the rows between adjacent pairs of the battery cells proximate the inlet are narrower than the gaps distant from the inlet.

* * * * *